Feb. 7, 1961 A. WERNER 2,970,690
TESTING APPARATUS
Filed Dec. 24, 1956 2 Sheets-Sheet 2
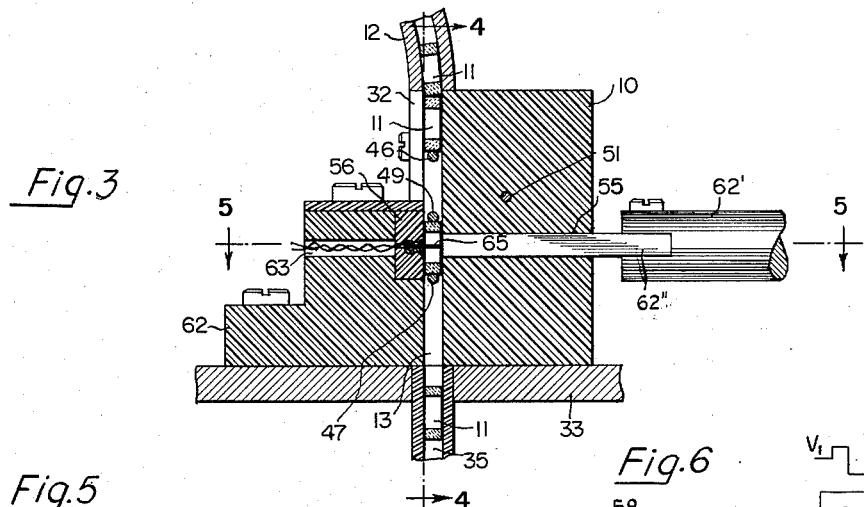
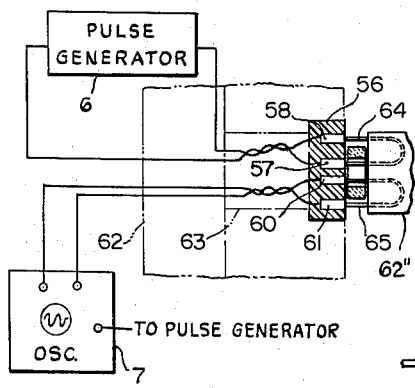
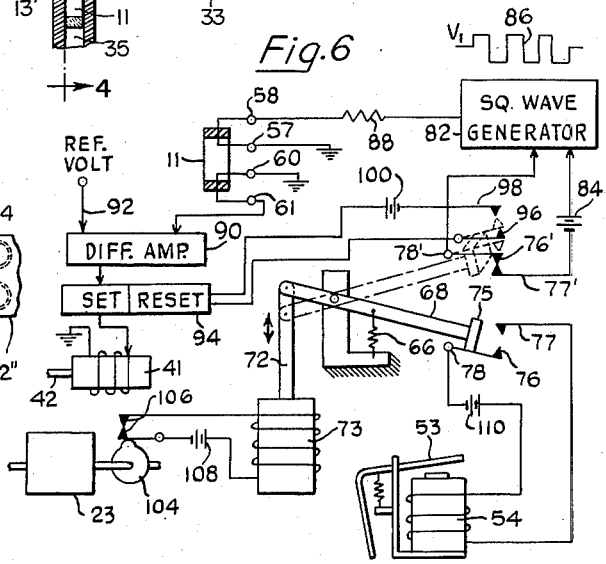
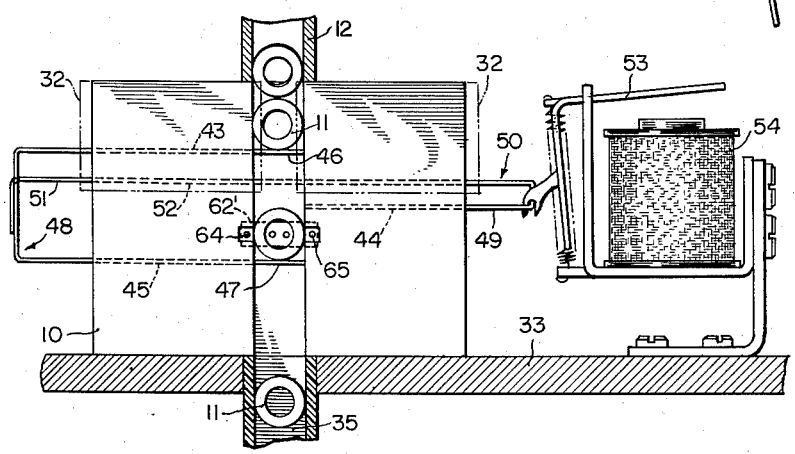
INVENTOR.
ANTON WERNER

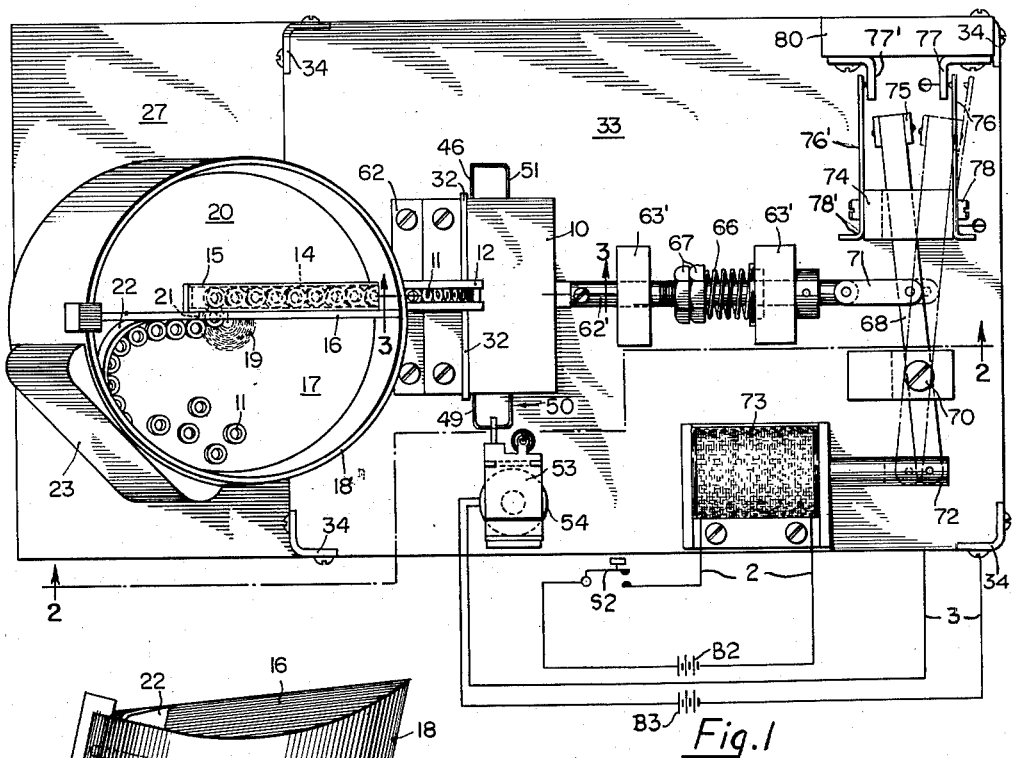
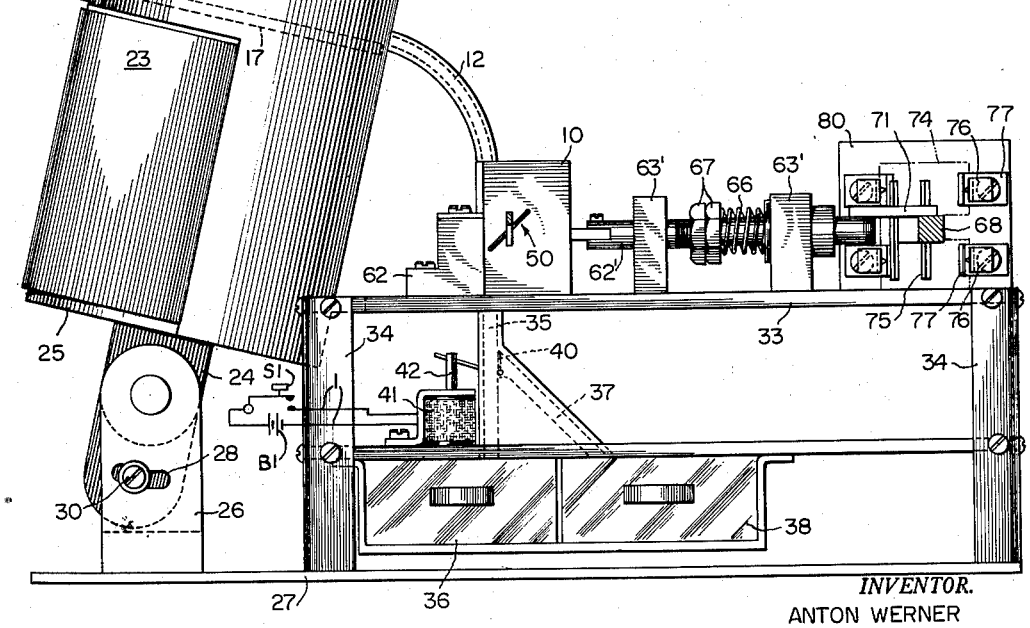

United States Patent Office 2,970,690
Patented Feb. 7, 1961

2,970,690

TESTING APPARATUS

Anton Werner, Philadelphia, Pa., assignor to Burroughs Corporation, Detroit, Mich., a corporation of Michigan Filed Dec. 24, 1956, Ser. No. 630,217

15 Claims. (Cl. 209—72)

The present invention relates to object handling mechanisms and more particularly to apparatus for feeding, testing and sorting of toroidal magnetic cores.

Toroidal cores of ferromagnetic materials having a substantially square hysteresis loop and magnetic remanence properties have come into widespread usage in the construction of binary elements in digital data processing and storage systems. It has been found that properties desirable in analyzing the adaptability of ferromagnetic cores for this use are, (1) the squareness of the hysteresis loop, (2) the switching time from one magnetic remanence polarity to the other, and (3) the response of the cores at different input excitation levels. The squareness test will afford an indication of the expected response ratios of a given core to the respective signals which do and do not change the remanence condition of the core. The switching time test affords a measure of the expected maximum operational frequency and the excitation level test may be used to indicate the adaptability of cores for particular circuit conditions as well as the operational efficiency.

Manufacturing and processing techniques for the production or toroidal cores of the type described may be critical. The cores are usually made of a number of turns of thin ferromagnetic ribbon wrapped on a non-magnetic bobbin. These turns may be welded and annealed after winding, if desired. Tolerances in core winding, welding, annealing and ribbon dimensions or other properties may vary considerably from unit to unit, thereby necessitating individual test of finished units. Since it is expensive to put transformer windings about toroidal cores, commercial type testers should be capable of indicating the core properties so that rejections may be made before permanent coils are wound thereon.

Such testing equipment has herebefore been proposed but in many respects has been found inadequate and lacking in the required precision. For example, one such apparatus comprises a revolving wheel having pins mounted thereon to which cores are fed and picked up successively by the pins. The wheel then carries a pin and core to a test station where the winding is tested for calibrated accuracy. During such a test a single wire system is used so it is not possible to take off the induced voltage in the pin because there is no way to position secondary contacts directly above and below the core in order to obtain a true picture of the secondary output. This is due to the difficulty of positioning the core straight because it tends to reach its position at an angle. Further the secondary contacts require a spacing at least greater than the core itself, which is another disadvantage of the one wire system.

It is therefore, a general object of the invention to provide improved apparatus for testing toroidal magnetic cores.

It is also an object of the invention to provide means for automatically and accurately positioning toroidal cores for individual testing.

Another object is to provide a system for testing the squareness of hysteresis loops, the switching time, and the relative response to different driving pulses of different ferromagnetic core materials.

A further object is to provide a simplified test instrument with electronic exciting circuitry and display means cooperating therewith for high speed toroidal core testing to measure the properties of cores before they are provided with permanent windings.

A still further object is to provide core testing apparatus wherein cores are sorted as to their bad or good characteristics.

Further objects and advantages of the persent invention will be found throughout the following more detailed description thereof, wherein its organization and operation is presented in connection with the accompanying drawings illustrating a preferred embodiment, and in which:

Fig. 1 is a top plan view of apparatus embodying the invention;

Fig. 2 is a side elevational view of the apparatus of Fig. 1, the view being taken along the line 2—2 thereof;

Fig. 3 is a fragmentary sectional view taken along line 3—3 of Fig. 1;

Fig. 4 is a sectional view taken along line 4—4 on Fig. 3;

Fig. 5 is a fragmentary view on enlarged scale of a portion of the core test supporting apparatus; and Fig. 6 is the diagrammatic representation of an electrical circuit which may be employed with the preferred embodiment of the present invention.

Referring to the drawings, and particularly to Figs. 1 and 2 thereof, one form of the invention is shown as comprising a testing station or block 10 of insulating material to which magnetic cores 11 are fed in single file to be tested one at a time as will be described hereinafter, such feeding being by way of a chute 12 discharging at its lower end into a vertically disposed receiving slot 13, Fig. 3. The upper end of the chute 12 communicates with the discharge end of an inclined passage 14, which is formed by a guide strip 15 attached to a plate 16 in spaced relation. This plate 16 is mounted in a vertical plane transversely disposed across the face of a circular disc 17 rotatably mounted in the plane of the open end of a cylindrical casing 18 and having a portion 20 forming with the plate 16, a hopper into which a quantity of the cores 11 are placed and conveyed by the disc 17 when rotating to a side aperture 21 in plate 16. Aperture 21 is dimensioned to permit the passage of but one core at a time and is located substantially on the axis of and substantially in the plane of the upper face of disc 17, where it communicates with passage 14. Also it should be noted that the axis of casing 18 is inclined, as shown in Fig. 2, so that the cores entering passage 14 travel downwardly by gravity on the inclined face of disc 17 to enter chute 12. Furthermore, the portion of disc 17 which forms the moving bottom of the hopper functions as a conveyor carrying the cores upwardly to abut plate 16 and form in single file while travelling downwardly on the inclined disc face in contact relation with the inner side of plate 16 thereby to ride into register with the lateral aperture 21, which opens on the high side of the axis of disc 17. When so registered, the conveyor action ejects the registered core into the upper end of passage 14 where it feeds downwardly to enter chute 12.

As a means for assisting the conveyed cores 11 into single file, it is preferable to locate an arcuate deflector 22 in the path of the upwardly moving cores 11, such deflector providing a guide terminating in contact with plate 16 above aperture 21. Also as an aid in this action a roughened area 19 is provided on the hopper disc face leading up to aperture 21. The disc 17 is arranged to be driven by a motor 23 mounted on the side of the casing and transmitting motion through a suitable gear unit to the shaft (not shown) on the disc, such power transmission being of such conventional design as to make it unnecessary to show or describe in detail. Also casing 18 is mounted for angular adjustment, which in this instance comprises a flat strut 24 fixed to bottom plate 25 of casing 18 and depending to be straddled by a bifurcated standard 26 rising from base 27 for the complete assembly. Standard 26 has aligned arcuate side slots 28, only one of which is shown in Fig. 2, generated about the pivot point of the casing as a center, for the passage of an adjusting bolt 30 which passes through strut 24. Thus, the inclination of disc 17 can be adjusted as desired.

For positioning cores 11 as they are successively discharged from chute 12, each core drops edgewise into the vertically disposed slot 13, Fig. 3, which is cut in the face of block 10 and has a width dimensioned to straddle the core diametrically without a damaging restraining action. As shown most clearly in Fig. 4 the open side of slot 13 is protected by two spaced apart members 32 of insulating material fastened to block 10 to overlie opposite sides respectively of the slot 13. The block 10 is supported by a horizontally disposed base panel 33 mounted upon a skeleton frame 34 rising from base 27 accurately to position block slot 13 in alignment with the outlet from chute 12. Panel 33 is provided with a core discharge channel 35, Figs. 2, 3 and 4, as a continuation of core slot 13, and leading to a core collecting tray 36. A branch channel 37 forms a communication between channel 35 and a second core collecting tray 38. The two channels 35 and 37 are selectively controlled by a shutter 40, pivotally mounted at the junction of the channels with core discharge slot 13, and arranged to be operated in response to a core test to sort the bad cores from the good ones. This latter responsive means includes a relay 41 having a spring biased armature 42 connected to shutter 40 for selecting the channel which is to receive a core as a result of a test. This relay 41 is only operated when the test equipment detects a bad core.

The selection of a good core from a bad core may be performed by hand or by automatic apparatus. One form of apparatus suitable for performing the selection function by hand is shown in Fig. 2, to comprise a source of potential such for example, as the battery B1 and a push button switch S1. The battery B1 and the switch S1 may be connected in series circuit over the leads 1 to the coil of the relay 41. Closure of switch S1 energizes the relay 41 retracting plunger 42 thereby causing the shutter 40 to block the core path to bin 36 and thus open the core pathway to bin 38.

In order to control the gravity core feed to successively support cores in test position, block 10 has three transversely disposed guide holes 43, 44 and 45, Fig. 4, extending therethrough in the same vertical plane to open into feed slot 13 at intervals spaced substantially equal to the diameter of the respective cores. The holes 43 and 45 respectively serve as guides for legs 46 and 47 of a U-shaped wire finger 48 which is arranged to be reciprocated into and out of the path of the descending cores. The hole 44 serves as a guide for one leg 49 of a second U-shaped wire finger 50 having its other leg 51 guided in an offset hole 52 passing back of slot 13. This leg 51 projects through block 10 and is welded or otherwise made fast to finger 48 and thus becomes the means of transmitting reciprocating motion to the three legs. The bridged end of finger 50 is connected to the spring biased armature 53 of a pulse operated solenoid 54 whereby the three control finger legs are reciprocated in timed relation to the feeding cores. Initially, with solenoid 54 deenergized, finger 48 is drawn to the right, as seen in Fig. 4, so that leg 46 is in position to support the column of cores to be tested. A pulse now energizes solenoid 54 to push the two fingers transversely of slot 13 so that leg 46 is withdrawn from under the lowermost core and leg 49 moves into position to support the released core until deenergization of the solenoid returns leg 46 to core column supporting position while retracting leg 49 to permit the core to drop upon leg 47 which has accompanied leg 46 on its movement across slot 13. Thus, the cores are released one at a time while all following cores are supported out of contact with the core being tested. Each core when in testing position stands in a vertical plane with its bore in register with an axially aligned transverse bore 55 through block 10.

In order to apply test windings to a positioned core, a multi-terminal connector 56, Fig. 5, of insulating material is mounted in face contact with block 10 in axial alignment with bore 55 and a core when the latter is in test position. Connector 56 has two contacts 57 and 58 forming terminals of a current pulse input circuit and two contacts 60 and 61 forming terminals of a core output circuit. A suitable source of pulses for testing the hysteresis of magnetic cores may comprise any well known pulse generator 6 connected in series circuit with the leads of the input contacts 57—58 to afford a means supplying pulses to the core under test. The output circuit may include an oscilloscope 7 connected to the leads of the output contacts 60 and 61 for visually indicating the magnetic hysteresis condition of the core under test and for determining through comparison of the waveforms resulting therefrom with a predetermined waveform whether the core is good or bad. As here shown connector 56 is supported on a base 62 seated upon panel 33 and having a passage 63 through which the lead wires pass to their respective contacts. All such contacts are of electrically conducting non-magnetic material. Also each pair of conducting leads from the contacts are preferably twisted to eliminate electrical pick-ups, stray flux, etc. It is important to note that in assembled condition contacts 57 and 58 are in parallel spaced relation to terminate in close proximity to one side of the positioned core but with contact 57 in register with the bore of the core, while contact 58 is radially further from the core center than the periphery of the core. That is, contact 58 is in register with the space around the core. Similarly contacts 60 and 61 are in parallel spaced relation to terminate in close proximity to the same core side as the other contacts but with contact 60 in register with the bore of the core, while contact 61 is radially further from the core center than the periphery of the core. That is, contact 61 is opposite a portion of slot 13 surrounding the core, see Fig. 4.

For establishing the testing circuits, to be explained hereinafter, a plunger 62' including contact carrying plunger member 62" is mounted for reciprocating movement in fixed guides 63'. Member 62" is thus slidable through bore 55 to make and break the two circuits of the aforesaid terminal contacts by means of two bridging contactors 64 and 65 carried on the free end of member 62". Contactor 64 is U-shaped and so mounted and dimensioned as to pass one prong through the core and the other on the outside of the core, thus bridging contacts 57 and 58 to close the input primary circuit when plunger 62' is at the end of its operating stroke. Likewise, contactor 65 is U-shaped and so mounted and dimensioned as to pass one prong through the core while its other prong passes outside the core, thus bridging contacts 60 and 61 to close the output secondary circuit when plunger 62' is at the end of its operating stroke. In effect therefore, member 62", of insulating material, is a four pronged plug, two prongs of which are arranged to pass through the core bore while the other two prongs straddle the core. The need for adequately insulating the two core transversing contactor prongs should be apparent when, as in the present instance, the diameter of the core bore is of the order of fifty thousandths of an inch and hence requires exceedingly small prongs to isolate the two windings for test purposes. Thus, member 62" with its contactor prongs forms means for respectively bridging input and read-out core testing circuits.

Referring more particularly to Fig. 1, as a means for linearly actuating member 62" to circuit closing position, plunger 62' is spring loaded, and thus is biased toward circuit closing position by means of a coil spring 66 compressed between a pair of adjusting nuts 67 threaded upon the plunger and a convenient fixed guide 63'. Movement in the opposite direction to open the circuits takes place through the medium of a solenoid controlled lever 68 carried by a pivot 70 intermediate its ends. The end of plunger 62' is connected to lever 68 at one side of pivot 70 by a link 71. The armature or core 72 of a solenoid 73 is connected to the end of lever 68 on the other side of pivot 70. The plunger connected length of lever 68 rides under a fixed guide plate 74 and terminates in a pusher head 75 arranged to close a switch for controlling the circuit to solenoid 54. In the present instance, this switch is in the form of a flexible spring strip contactor 76 which is fixed at one end to plate 74 while its free contactor end can travel in a path to engage a circuit terminal contact 77, when deformed by circuit closing movement of lever 68. The fixed end of contactor 76 is anchored to plate 74 by a screw or binding post 78 providing the other terminal of the circuit which controls the operation of the core feed control solenoid 54. Terminal contact 77 is carried by a suitable fixed part 80. A second switch formed by the members 76', 77' and 78' similar to the members 76, 77 and 78 is disposed adjacent and parallel to the first switch and is operated by the lever 68 in substantially identical fashion thereto in order to control an automatic core testing and sorting circuit to be described hereinafter.

Solenoid 73 is operated from a control circuit for timed operation to withdraw plunger 62' from core testing position, which action causes lever 68 to shift contactor 76 to energize core control circuit solenoid 54 via contacts 76—77. A suitable circuit 2 for controlling the solenoid 73 may comprise a push button switch S2 and a battery B2 connected in series with the solenoid. A suitable circuit 3 interconnects the switch contacts 76—77 with the solenoid 54 and includes a source of electrical energy such as the battery B3. As shown in Fig. 1 the circuit extends under the supporting panel 33 and rises through holes in the panel for connection to the switch contacts 77 and 78. It is apparent that upon deenergization of solenoid 73, lever 68 will move in the direction to allow contactor 76 to engage contact 77 and close the circuit to the solenoid 54. Thus, energizing and deenergizing of solenoid 73 causes the circuit of solenoid 54 to make and break in such succession of steps that the two interconnected fingers 48 and 50 have a reciprocating movement allowing one core at a time to drop into core testing position. In each such testing position, the timing control circuit for solenoid 73 is opened to permit the spring loaded plunger 62' to enter the core and close the core pulse primary circuit and its associated output circuit whereupon a decision is made as to whether the core is good or bad.

The construction and hand operation of the core tester apparatus having been previously described it is now desired to describe on form of automatic control circuitry which could be used to perform the testing, timing and sorting operations earlier referred to. Since the circuit parameters hereinafter referred to are all of simple construction and readily available to those skilled in the art it is believed that only a brief discussion of their utilization in the present apparatus is required. Other and different circuits and circuit elements could be substituted for those now to be described within the purview of the present invention and no attempt has been made to set forth all of the various known combinations, and permutations of these parameters.

The core testing mechanism with which the present invention is described may be used for many operations in connection with testing cores. By way of example, the circuitry shown in Fig. 6 illustrates one form of apparatus for ascertaining whether or not a core will be fully switched when there is applied thereto only one half of the current necessary to fully switch the core. It is well known in magnetic memory devices wherein coincident current techniques are used that if there is to be a read-out from a particular core in the magnetic memory there is applied to that core on each of two separate windings thereon a current having a value of $$\frac{I}{2}$$

The two separate magnetizing forces represented by each of the $$\frac{I}{2}$$

currents applied to the magnetic core obviously are equivalent to the full value of I necessary to switch the core. If this concept is considered it becomes evident that if a core can be switched with only the application of $$\frac{I}{2}$$

such core would be undesirable in a magnetic memory device because it would provide spurious output signals when it was connected to a particular row or column in which the read-out core was located. In summary then, the purpose of the circuitry shown in Fig. 6 is to supply to the core to be tested a magnetizing current $$\frac{I}{2}$$

and if the core should fully switch in response to this applied current then the core will be considered "bad." Referring to the diagrammatic circuit of Fig. 6 and assuming that a magnetic core 11 is in that position, as shown, contacts 76', 77' and 78' will be closed since arm 68 carrying member 75 is spring biased away therefrom.

A square wave generator 82 of well known construction is energized from a source of electrical energy such as a battery 84 providing an output voltage V which is applied to a resistance 86 to supply a current value $$\frac{I}{2}$$

to the core 11. The square wave signal 86 from the generator 82 continually reverses the flux within the core and appears as an output at the core secondary winding via contacts 60—61. If the core becomes fully switched in response to the $$\frac{I}{2}$$

magnetizing current an output will appear at the secondary winding 60—61 which is relatively large. In other words, if a magnetization current of I/2 did not switch the core there would be only a small noise signal present which would be proportional to the small degree of change represented by the slope of the hysteresis loop ahead of the knee. However, if the magnetizing current I/2 should have switched the core when the output signal would be proportional to the change in flux represented by the hysteresis loop at least from the knee to the saturation point which is relatively large compared to the noise signal. This secondary winding output signal is fed to a differential amplifier 90 also of conventional and well known construction. The other input to the differential amplifier 90 is connected to a reference voltage source 92 which is set at the noise level. The differential amplifier provides means such that if the output signal from the secondary winding via contacts 60—61 is not greater than the noise signal level there will be no output from the differential amplifier. If there is no output the core being tested is considered "good" in which case it falls by gravity into bin 36. If on the other hand, there is a relatively large signal output from the secondary winding indicating that a core being tested has been switched in response to the magnetizing current $$\frac{1}{2}$$

the differential amplifier 90 will produce an output signal.

The output from the differential amplifier is coupled to a bistable multivibrator, such as a flip-flop 94 transferring the flip-flop to its "set" side. The output from the "set" side of flip-flop 94 will energize solenoid 41 thereby moving the shutter 40 to the proper position for dropping a "bad" core into the bin 38. When the arm 68 is actuated to open the contacts 76' and 77' it simultaneously closes the contacts 96 and 98 energizing a reset circuit to flip-flop 94 including battery 100. Closure of contacts 86 and 98 generates a reset pulse applied to flip-flop 94 to transfer the same to its "reset" side and ready it for the next testing operation.

The duration of the output signal from flip-flop 94 is or may be of such length that during this time the high spot on cam 104, which may be rotated by means of the shaft of the tumbler motor 23 or by another motor, closes a pair of contacts 106—106 thereby energizing solenoid 73 through battery 108 or, solenoid 73 may be actuated by means of switch S2 as earlier mentioned herein. As a result of the energization of solenoid 73 plunger arm 72 is retracted closing contacts 76, 77 and 78 and energizing solenoid 54 through battery 110. Energization of solenoid 54, in the manner earlier described herein, discharges the core presently in the test position and permits a new core to drop into place to be tested. Further, rotation of cam 104 by motor 23 moves the cam high spot out of engagement with contacts 106—106 opening these contacts and de-energizing solenoid 73 whereupon spring 66 causes arm 68 to move from its dotted line to its full line position to engage the primary and secondary windings around the next core to be tested. This action simultaneously opens the circuit to solenoid 54, closes switch 76', 77' and 78', opens the flip-flop reset circuit contacts 96–98, and initiates operation of square wave generator 82 for applying electrical testing currents to the new core in the manner earlier described herein.

Circuit elements including square wave generator 82, differential amplifier 90, and bistable multivibrator 94 suitable for use in the manner herein disclosed are described in detail in a number of well known electrical engineering textbooks. "Electronics and Radio Engineering," F. E. Terman, McGraw-Hill, Fourth Edition, 1955, at page 626 describes and illustrates a multivibrator capable of generating square waves as set forth hereinabove. A differential amplifier is described in the same text at page 623.

It will now be apparent that a complete unitary system for feeding magnetic cores one at a time to a testing position has been devised where each core is provided with a primary coil and a secondary coil, thereby to provide a magnetic coupling for accurate test purposes. Also by the positioning of the core and the novel means of applying the test windings, no strain, bending or other displacement of the pulse conducting leads can take place by the assembly of the invention. Furthermore, no induced voltage is present to minimize the value of the test, such as where fixed pins are used in some prior apparatus for testing.

What is claimed is:

1. An apparatus for testing the characteristics of magnetic cores comprising, the combination of a core positioning member having a core receiving slot and two aligned holes spaced by said slot, means for feeding cores in single file into said slot, means operatively associated with said feeding means for successively stopping said cores in register with said holes, a normally open primary circuit, terminal contacts for said primary circuit juxtaposed to a testing position for a core, a normally open secondary circuit, terminal contacts electrically interconnecting said secondary circuit spaced from said primary contacts and also juxtaposed to the testing position for a core, a plunger operatively associated with the feeding means insertable through said holes and a positioned core, contactors carried by said plunger to close the respective circuits when said plunger is inserted through said core to complete windings respectively about said core for testing the magnetic coupling of said core, and means for reciprocating said plunger in timed relation to the positioning of a core.

2. An apparatus according to claim 1 wherein said contacts are fixed and said contactors are shaped to straddle the core rim.

3. An apparatus according to claim 1 wherein said core stopping means includes an electromagnetically controlled reciprocable member.

4. An apparatus according to claim 3 wherein means operated by said plunger energizes said reciprocable member in timed relation to the retracting of said plunger from said core.

5. An apparatus for testing the characteristics of a magnetic core, comprising the combination of a core positioning member having a vertically disposed core receiving slot and a horizontal transverse bore intersecting said slot, a conduit for feeding cores in single file to discharge into the upper end of said slot, a hopper for cores to be tested, having an outlet to said conduit, means feeding said cores to discharge through said outlet, means successively stopping said cores in register with said bore, means including a plunger insertable through said bore and a positioned core for completing winding circuits about said core to test the magnetic coupling of one core with respect to a standard characteristic and means for reciprocating said plunger in timed relation to the positioning of a core.

6. An apparatus according to claim 5 wherein a rotatable disc forms the bottom of the hopper.

7. An apparatus according to claim 6 wherein a plate is disposed transversely of said disc to subdivide said disc into a hopper area and a discharge area, said outlet being in said plate and opening against said disc.

8. An apparatus according to claim 7 wherein said disc is inclined upwardly towards said outlet.

9. An apparatus according to claim 8 wherein the core supporting area of said disc has a roughened surface.

10. Automatic magnetic core testing apparatus comprising, an electrically insulating non-magnetic core testing station, dielectric means supporting a plurality of electrically conductive members at said testing station, said conductive members extending in a horizontally aligned row within said station, means connecting said conductive members to a source of electrical energy, a plurality of elongated conductive members, means to move said elongated members into engagement with said conductive members to thereby cause an electrical circuit to be completed from said source of energy through both said members, movable means permitting a core to advance under the force of gravity into said testing station, means for supporting said core in said testing station, and means for automatically reciprocating said elongated members in timed relation to the testing of said core.

11. Automatic core testing apparatus comprising, a core testing station, movable means permitting a magnetic core to advance under the force of gravity into said testing station, means operable in conjunction with said movable means for supporting said core at said testing station, a first plurality of electrically conductive receptacle members located within said testing station and disposed in a row, at least some of said members being arranged in axial alignment with the bore of the core to be tested, means connecting said receptacle members to a source of electrical energy, a second plurality of electrically conductive members disposed in a row adjacent said test station, rectilinearly movable means operatively associated with said second plurality of members and adapted to engage said second plurality of members with said receptacle members, thereby to complete an electrical circuit from said source of energy through said first and second members, and means for automatically reciprocating said movable means in timed relation to the testing of said core.

12. Apparatus for testing the electrical characteristics of magnetic cores comprising, means supporting a column of cores in edgewise relationship, said supporting means including a plurality of members slidably reciprocable through said core supporting means and into and out of contact with a magnetic core to be tested, means to cause a first one of said movable members to be removed from said core supporting contact so as to release said cores to gravity, means moving a second one of said movable members into core supporting contact after release of said cores, another of said members slidably engaging a released core to support said core in a test position, means connectable to a source of electrical energy, electrically conductive means operatively associated with said last means and reciprocably engageable about the core under test and when so engaged completing a plurality of electrical winding circuits about the core for determining coincidence of the magnetic hysteresis characteristics of this core with a standard core characteristic.

13. Automatic magnetic core testing apparatus comprising, a core testing station, a first plurality of fixed electrically conductive contacts, insulatingly supported in said testing station, said contacts extending toward the bore of the core under test, a second plurality of oppositely disposed complementary electrically conductive contacts rectilinearly movable toward said first contacts and at the end of their travel theretoward operably engageable with said first plurality of contacts to form a pair of electrical windings about a core under test, means connecting said first plurality of contacts to a source of electrical energy, said first and second contacts when connected to said source of energy and interengaged with one another completing a test circuit including said windings from said source of energy through said core, means for guiding a column of cores under the force of gravity, one at a time, into said testing station, means for supporting a core at said testing station, means for automatically reciprocating said second plurality of contacts into and out of engagement with said first plurality of contacts in timed relation to the testing of said core, and means operatively associated with said last means for sorting sub-standard cores from standard tested cores.

14. Automatic magnetic core testing apparatus comprising, a core testing station, a plurality of fixed electrically conductive contacts located at said testing station, movable means carrying a plurality of conductive contacts projecting outwardly therefrom towards said fixed contacts and into axially aligned relationship with the bore of a core under test, said last contacts being adapted to straddle said core, means connecting said contacts to a source of electrical energy, electro-magnetic means for rectilinearly reciprocating said carrying means to cause said last contacts to engage said fixed contacts, thereby to establish an electrical circuit from said source of energy through both said contacts, means for guiding a core advancing under the force of gravity into said testing station, movable means for supporting said core at said testing station, and electro-magnetic means for automatically reciprocating said supporting means in timed relation to the testing of said core.

15. Apparatus for use with a magnetic core tester comprising, a core testing station having a substantially vertical core feed passage opening at the lower end thereof into an accept receptacle and a reject receptacle, a first and second plurality of fixed electrically conductive contacts located in said testing station, first means coupled to said first fixed contacts for connection to a source of selected electrical signals, movable means carrying a first and second plurality of U-shaped conductive contacts having the legs thereof projecting outwardly therefrom towards said first and second plurality of fixed contacts and into axial alignment therewith the legs of said U-shaped contacts being adapted to straddle the magnetic core being tested so as to bring the same into engagement with said first and second fixed contacts thus to form respectively a primary and a secondary electrical circuit about said core, means to move said movable means, said secondary circuit generating a determining signal in response to the application to said primary circuit of said selected signals, means coupled to said secondary circuit for connection to a comparison apparatus for comparing the electrical output from the secondary circuit of said core with said selected electrical signals, and electro-mechanical means including means connectible to said comparing means for selecting the accept or the reject receptacle into which said cores are directed under the force of gravity in response to a signal from said comparison means.

References Cited in the file of this patent

UNITED STATES PATENTS

| | | |
|---|---|---|
| 2,679,025 | Rajchman et al. | May 18, 1954 |
| 2,711,509 | Endres et al. | June 21, 1955 |
| 2,762,015 | McGrath | Sept. 4, 1956 |
| 2,795,757 | Wylen | June 11, 1957 |
| 2,796,986 | Rajchman et al. | June 25, 1957 |